(12) United States Patent
Chen et al.

(10) Patent No.: US 11,093,501 B2
(45) Date of Patent: *Aug. 17, 2021

(54) SEARCHING IN A DATABASE

(71) Applicant: International Business Machines Corporation, Armonk, NY (US)

(72) Inventors: Yao Liang Chen, Beijing (CN); Xiao Yan Chen, Beijing (CN); Sheng Huang, Shanghai (CN); Kai Liu, Beijing (CN); Xiao Min Xu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 411 days.

This patent is subject to a terminal disclaimer.

(21) Appl. No.: 16/005,552

(22) Filed: Jun. 11, 2018

(65) Prior Publication Data
US 2018/0293279 A1 Oct. 11, 2018

Related U.S. Application Data

(63) Continuation of application No. 14/931,718, filed on Nov. 3, 2015, now Pat. No. 10,042,888.

(30) Foreign Application Priority Data

Nov. 28, 2014 (CN) .......................... 201410714219.8

(51) Int. Cl.
G06F 16/2455 (2019.01)
G06F 16/2458 (2019.01)
G06F 16/2457 (2019.01)

(52) U.S. Cl.
CPC ...... *G06F 16/2455* (2019.01); *G06F 16/2474* (2019.01); *G06F 16/2477* (2019.01); *G06F 16/24575* (2019.01)

(58) Field of Classification Search
CPC ... G06F 16/951; G06F 16/273; G06F 16/2455
See application file for complete search history.

(56) References Cited

U.S. PATENT DOCUMENTS 7,031,958 B2 4/2006 Santosuosso
8,190,595 B2 5/2012 Bruno et al.
(Continued)

FOREIGN PATENT DOCUMENTS

CN 102006278 A 4/2011
CN 102737124 A 10/2012
(Continued)

OTHER PUBLICATIONS

Notice of Rejection from Japanese Application No. 2017-526956, dated Apr. 16, 2019.
(Continued)

*Primary Examiner* — Mariela Reyes
*Assistant Examiner* — Courtney Harmon
(74) *Attorney, Agent, or Firm* — Zilka-Kotab, P.C.

(57) ABSTRACT

A computer-implemented method is provided that includes receiving a search request to perform a search in a time series database, where the time series database stores a plurality of sequences of measured values arranged in chronological order, extracting from the search request a condition for performing the search in the time series database, the condition including a target subsequence to be searched for within the plurality of sequences of measured values within the time series database, selecting a search algorithm to perform the search from a plurality of search algorithms registered to the time series database, based on one or more characteristics of the condition and historical statistic data of one or more historical searches conducted on the time series database, and obtaining a search result from the time series database, utilizing the search algorithm.

12 Claims, 10 Drawing Sheets

(56) References Cited

U.S. PATENT DOCUMENTS

| | | | |
|---|---|---|---|
| 8,433,701 | B2 | 4/2013 | Sargeant et al. |
| 10,042,888 | B2 | 8/2018 | Chen et al. |
| 2008/0301135 | A1 | 12/2008 | Alves et al. |
| 2009/0018994 | A1 | 1/2009 | Hajdukiewicz |
| 2010/0198830 | A1* | 8/2010 | Stewart ............. G06F 16/24539 707/741 |
| 2011/0055718 | A1 | 3/2011 | Tanaka et al. |
| 2013/0091105 | A1 | 4/2013 | Bhave et al. |
| 2013/0238619 | A1 | 9/2013 | Hanaoka et al. |
| 2015/0120223 | A1* | 4/2015 | Dannecker ............. G06Q 50/06 702/61 |
| 2016/0092570 | A1* | 3/2016 | Ago ...................... G06F 16/215 707/770 |
| 2016/0154852 | A1 | 6/2016 | Chen et al. |

FOREIGN PATENT DOCUMENTS

| | | |
|---|---|---|
| CN | 103838818 A | 6/2014 |
| CN | 103853752 A | 6/2014 |
| JP | 2012117987 A | 6/2012 |
| JP | 2013061733 A | 4/2013 |
| JP | WO2011142026 A1 | 7/2013 |
| JP | 2014053030 A | 3/2014 |
| WO | 2012073526 A1 | 6/2012 |

OTHER PUBLICATIONS

Vangipuram, R., "Optimal Pattern Search for Database Systems," Proceedings of the 2013 International Conference on Pattern Recognition, Informatics and Mobile Engineering (PRIME), Feb. 21-22, 2013, pp. 491-495.

Mcleod et al., "Scalable Complex Pattern Search in Sequential Data," Non-Published Research Reports, Paper 99, Oct. 2008, pp. 1-11.

Kida et al., "Flexible Framework for Time-Series Pattern Matching over Multi-Dimensional Data Stream," New Frontiers in Applied Data Mining, vol. 5433, May 2008, pp. 1-12.

International Search Report and Written Opinion from PCT Application No. PCT/IB2015/058733, dated Feb. 23, 2016.

Miyamoto et al., "An Efficient Keyword Search Algorithm Used for Automatic Editing System for Network News," IEICE technical report, Theoretical foundations of Computing, vol. 95, No. 82, pp. 25-32, May 26, 1995.

Then et al., U.S. Appl. No. 14/931,718, filed Nov. 3, 2015.

Non-Final Office Action from U.S. Appl. No. 14/931,718, dated Nov. 1, 2017.

Notice of Allowance from U.S. Appl. No. 14/931,718, dated Mar. 30, 2018.

List of IBM Patents or Patent Applications Treated as Related.

* cited by examiner

SEARCHING IN A DATABASE

BACKGROUND

Various embodiments of the present invention relate to database management, and more specifically, to a method and apparatus for searching in a database.

With the development of technologies such as computer, data communication, real-time monitoring or the like, time series databases have been applied in various aspects such as equipment monitoring, production line management, financial analysis and so on. A time series refers to a set of measured values arranged in chronological order, and in the context of the present invention a node storing measured values may be referred to as a data point or data event. A time series database refers to a database for storing these measured values. Measured values may include various data. For example, in an application environment of monitoring bridge security, collected data may include pressure data and/or pressure intensity data collected by a certain sensor; in an application environment of weather forecasting, collected data may include temperature, humidity, pressure, wind force (e.g., including direction and magnitude), etc.

Similarity search is an important operation in time series databases. Specifically, similarity search refers to searching in a time series for similar subsequences to target subsequences. In the technical field of time series databases, a similar subsequence may be referred to as pattern for short. Typically a time series consists of massive data, and the time series might be continuously updated in real time by incoming measured values. For example, in the application environment of monitoring bridge security, tens of thousands of sensors might be deployed on the bridge to measure pressure at each location in real time. When the database is updated with a frequency of 1 second or even higher, very large amounts data will be generated.

Note similarity search does not require found patterns completely match with the target subsequence but may contain some difference. For example, an error bound may be e. A subsequence found by similarity search has the same length as a target subsequence (for example, the length equals m), and has a difference from the target subsequence that is less than or equal to e.

Since the time series database has a complex storage structure, the efficiency of searching in the time series database is rather unsatisfactory. In addition, since the time series database may store different types of data, a search mode that is suitable for one data type is not necessarily suitable for other data type. Therefore, how to increase the efficiency of searching in time series databases becomes a research focus. Further, currently the database system gets increasingly complex, and both a time series database and a relational database may be included. Therefore, how to search in a database system across different types of databases also becomes a research focus.

SUMMARY

Disclosed herein are various embodiments for efficiently searching a time series database. The embodiments may consider characteristics of the time series database and search in the time series database based on different search algorithms, so as to increase the efficiency of database systems.

In one embodiment, there is provided a computer-implemented method. The method includes receiving a search request to perform a search in a time series database, where the time series database stores a plurality of sequences of measured values arranged in chronological order, extracting from the search request a condition for performing the search in the time series database, the condition including a target subsequence to be searched for within the plurality of sequences of measured values within the time series database, selecting a search algorithm to perform the search from a plurality of search algorithms registered to the time series database, based on one or more characteristics of the condition and historical statistic data of one or more historical searches conducted on the time series database, and obtaining a search result from the time series database, utilizing the search algorithm.

In one embodiment, there is provided a computer-implemented method. The method includes receiving a search request to perform a search in a first database that is a time series database and a second database that is a relational database, where the time series database stores a plurality of sequences of measured values arranged in chronological order, extracting from the search request a first search request to search in the first database and a second search request to search in the second database, where the first search request includes a target subsequence to be searched for within the plurality of sequences of measured values within the time series database, searching in the first database using the first search request, and searching in the second database using the second search request, and generating a search result to respond to the search request based on a first search result from the first database and a second search result from the second database.

In one embodiment, there is provided apparatus for searching in a database, where the apparatus receives a search request to perform a search in a time series database where the time series database stores a plurality of sequences of measured values arranged in chronological order, extracts from the search request a condition for performing the search in the time series database, utilizing a processor, the condition including a target subsequence to be searched for within the plurality of sequences of measured values within the time series database, selects a search algorithm to perform the search from a plurality of search algorithms registered to the time series database, utilizing the processor, based on one or more characteristics of the condition and historical statistic data of one or more historical searches conducted on the time series database, and obtains, utilizing the processor, a search result from the time series database, utilizing the search algorithm.

In one embodiment, there is provided an apparatus for searching in a database system, where the apparatus receives a search request to perform a search in a first database that is a time series database and a second database that is a relational database, utilizing a processor, where the time series database stores a plurality of sequences of measured values arranged in chronological order, extracts from the search request a first search request to search in the first database and a second search request to search in the second database, utilizing the processor, where the first search request includes a target subsequence to be searched for within the plurality of sequences of measured values within the time series database, searches in the first database using the first search request, and searches in the second database using the second search request, utilizing the processor, and generates a search result to respond to the search request based on a first search result from the first database and a second search result from the second database, utilizing the processor.

In one embodiment, there is provided a computer program product for searching in a database, where the computer program product includes a computer readable storage medium having program instructions embodied therewith, where the computer readable storage medium is not a transitory signal per se, and where the program instructions are executable by a processor to cause the processor to receive a search request to perform a search in a time series database, where the time series database stores a plurality of sequences of measured values arranged in chronological order, extract, by the processor, from the search request a condition for performing the search in the time series database, the condition including a target subsequence to be searched for within the plurality of sequences of measured values within the time series database, select, by the processor, a search algorithm to perform the search from a plurality of search algorithms registered to the time series database, based on one or more characteristics of the condition and historical statistic data of one or more historical searches conducted on the database, and obtain, by the processor, a search result from the time series database, utilizing the search algorithm.

In this way, a search may be conducted in a time series database by considering characteristics of the time series database based on different search algorithms. Further, when there is a need to search a database system comprising various types of databases, the user may not need to consider interaction details of various types of databases within the database system, but may obtain a search result from the database simply by providing a search request to the database system.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
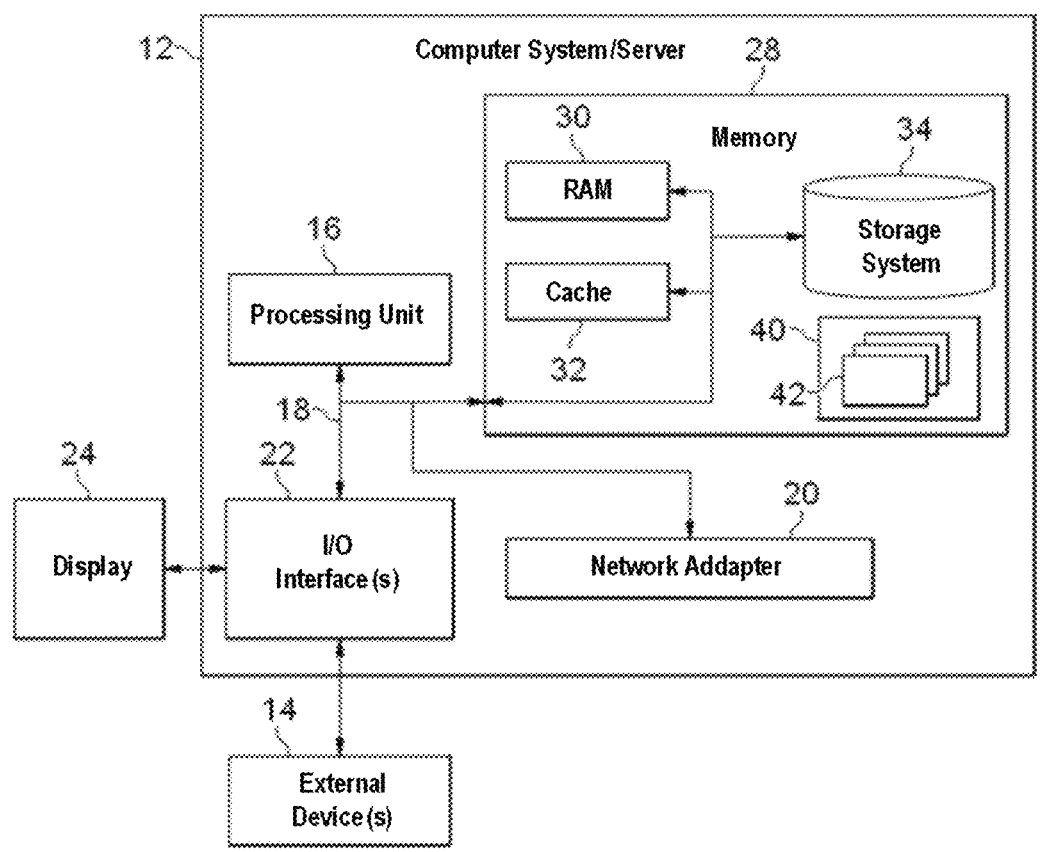
FIG. 1 schematically shows an exemplary computer system/server which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
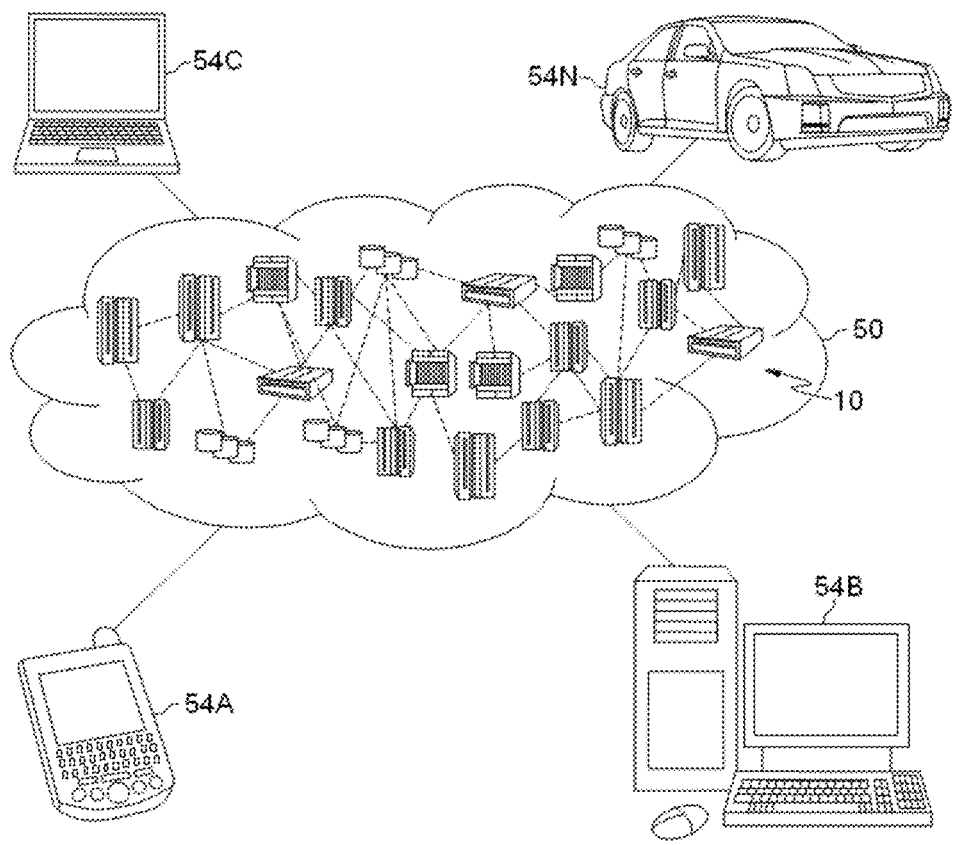
FIG. 2 schematically shows a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers may communicate. The local computing devices may be, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
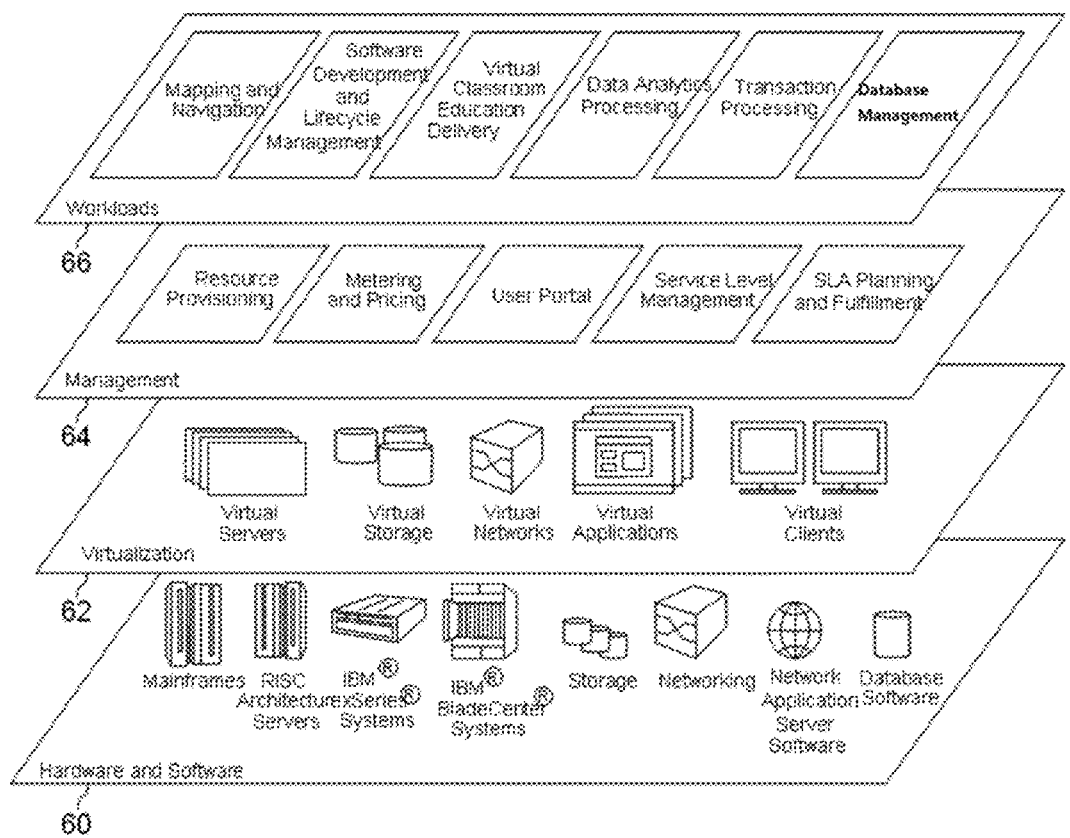
FIG. 3 schematically shows abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes (e.g. IBM® zSeries® systems); RISC (Reduced Instruction Set Computer) architecture based servers (e.g., IBM pSeries® systems); IBM xSeries® systems; IBM BladeCenter® systems; storage devices; networks and networking components. Examples of software components include network application server software (e.g., IBM WebSphere® application server software); and database software (e.g, IBM DB2® database software). (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and database management.

In one embodiment, the method for searching in a database system according to various embodiments may be implemented at workloads layer 66, so as to conveniently provide more abundant functions to clients of the database system in a cloud computing environment. Specifically, the embodiments may be implemented in a manner transparent to clients. That is, users of the database system can search in the time series database and further search in the database system comprising a relational database and a time series database, using an approach that is similar to query statements of traditional structured query language (SQL).

Note with the development of the cloud computing environment, existing database systems become nodes in the cloud computing environment. Therefore, the technical solution for searching in database systems as herein may not be limited to existing database systems, but may further be implemented at nodes in the cloud computing environment.

Figure 4:
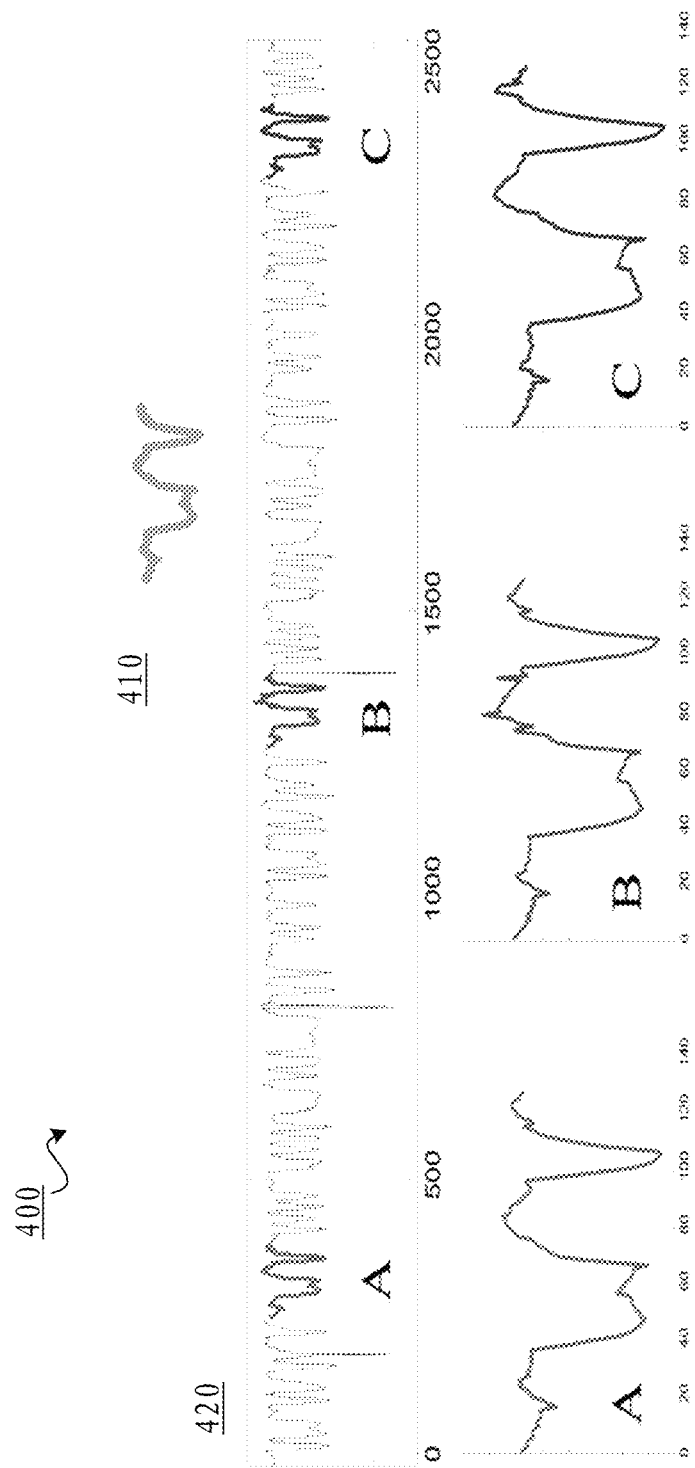
FIG. 4 schematically shows a view of the process of searching in a time series database for a pattern that is similar to a target subsequence.

FIG. 4 shows a schematic view 400 of the process of searching in a time series database for a pattern that is similar to a target subsequence. FIG. 4 shows a time series sequence 420 in the time series database, and a reference numeral 410 denotes a target subsequence involved in similarity search. In the context, similarity search refers to searching in time series 420 for subsequences that are similar to target subsequence 410. For example, returned patterns may comprise three subsequences, denoted as subsequence A, subsequence B and subsequence C respectively. Since the length of time series 420 shown in FIG. 4 is rather short, the search result returns only 3 patterns. When searching in a larger or super large time series (for example, searching for specific query sequences in a time series database comprising 5 years of meteorological data), possibly tens of thousands of candidate subsequences will be returned.

Although various technical solutions for searching in time series databases have been proposed in the prior art, these technical solution use the same mode for search, without considering the impact on search efficiency of search conditions in search requests. In the embodiments disclosed herein, there is proposed a technical solution for selecting a more suitable search algorithm based on search conditions in a search request, thereby greatly increasing search efficiency.

Specifically, in one embodiment, there is proposed a method for searching in a database, comprising: in response to receiving a search request to search in a database, extracting from the search request a condition for searching in the database; selecting a search algorithm matching the condition from a plurality of search algorithms registered to the database, based on historical statistic data of historical search conducted on the database; and obtaining a search result from the database by using the search algorithm, wherein the database is a time series database.

Figure 5:
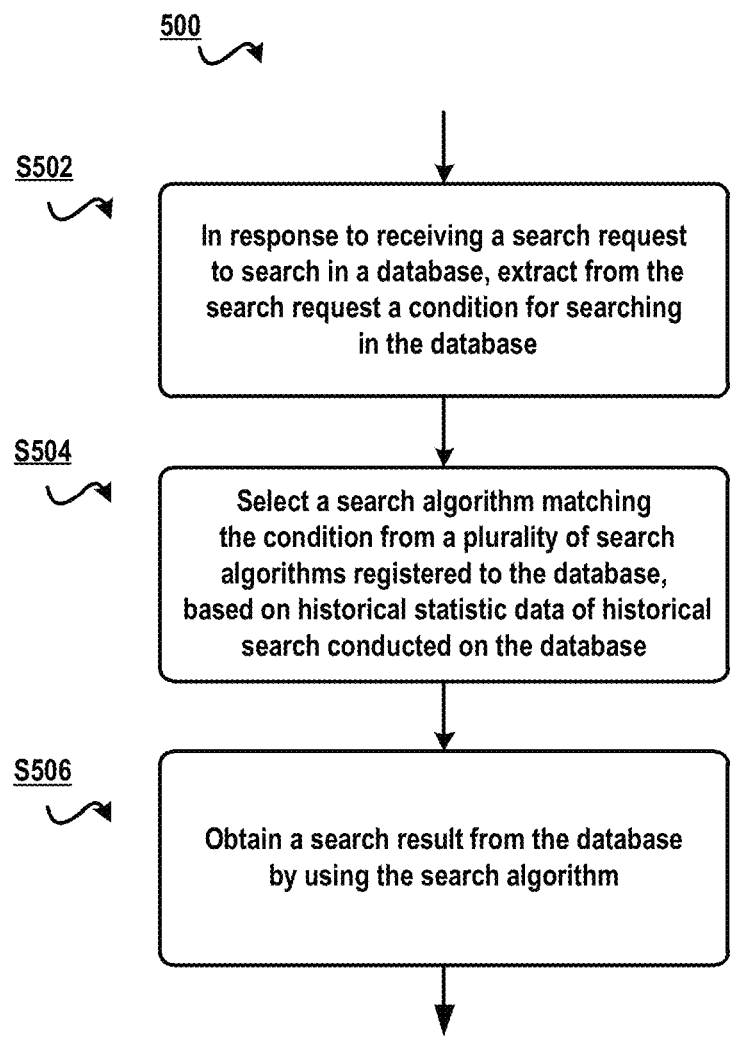
FIG. 5 schematically shows a flowchart of a method for searching in a database according to one embodiment of the present invention.

Specifically, FIG. 5 shows a flowchart of a method for search according to one embodiment. In step S502, in response to receiving a search request to search in a database, a condition for searching in the database is extracted from the search request. In various embodiments, the database is a time series database. Those skilled in the art should understand the search condition mentioned here may be a target subsequence (e.g., target subsequence 410 with reference to FIG. 4) when conducting similarity search. According to a specific application environment of the time series database, the condition may have different meaning. For example, in a time series database that stores electrocardiographs (ECG) of patients in a hospital, when it is desired to find a patient in whose electrocardiograph a given dangerous waveform appears, the search condition may be "given dangerous waveform appears."

In step S504, a search algorithm matching the condition is selected from a plurality of search algorithms registered to the database, based on historical statistic data of historical search conducted on the database. Those skilled in the art should understand that different types of search algorithms may be used to accelerate the search process based on different data types stored in the time series database. For example, ECG data is data related to heartbeats that are collected with predefined sampling frequency; since heartbeat data has a periodicity characteristic, subsequences associated with each heartbeat might have certain similarity. For another example, in the application environment of monitoring bridge security, although pressure data of the deck is also collected with predefined sampling frequency, since pressure of the deck is related to factors such as speed and load of vehicles on the deck during collection, a time series being collected might not have the periodicity characteristic. Therefore, it helps to increase the search efficiency by selecting a search algorithm based on the search condition for searching in a specific-type time series database.

In this step, a search algorithm matching the condition may be selected from a plurality of search algorithms registered to the database, based on historical statistic data of historical search conducted on the database. Specifically, historical statistic data of historical search associated with different search conditions and recorded when previously conducting search on the database may be taken into consideration for selecting a search algorithm that is most suitable for the current search condition. Specifically, there may be a variety of search algorithms in the time series database, and historical statistic data here may record associations between search conditions and a plurality of search algorithms.

In step S506, a search result is obtained from the database by using the search algorithm. According to one embodiment, when searching in the time series database by using a plurality of search algorithms, a corresponding search algorithm may be selected based on different search conditions, so as to increase the search efficiency. Therefore, with respect to each search, a more suitable search algorithm may be selected for the search.

In one embodiment, the historical statistic data is associated with corresponding efficiency of searching in the database by using various search algorithms among the plurality of search algorithms Efficiency of a plurality of historical searches conducted on the database may be recorded, and which search algorithm is used to assist in current search may be judged based on the recorded efficiency. In one embodiment, the database system may involve a plurality of search algorithms, for example, may include a search algorithm based on the Euclidean Distance (ED), or further include an LCSS based search algorithm, a DTW based search algorithm, etc. Those skilled in the art may select the most suitable search algorithm for a current search condition based on efficiency of various search algorithms that are used during historical search in the database.

In one embodiment, the historical statistic data is further associated with efficiency of searching in a table of the database by using the various search algorithms. Note the search efficiency is further related to a data table in which search is conducted. For example, the database may include a plurality of data tables, wherein table 1 stores ECG data and table 2 stores deck pressure data. In this embodiment, since the historical statistic data may be associated with search algorithms and search objects (i.e., in which data table search is conducted), the historical statistic data may be identified using two-tuples (algorithm, search object). For example, if the historical data shows that using an ED based search algorithm is more efficient when making a query on table 1, then an ED based search algorithm may be recommended as priority when searching in table 1.

In one embodiment, the efficiency includes time overhead, the time overhead describing time overhead for returning one time point in subsequences in the search result; and selecting the search algorithm matching the condition from the plurality of search algorithms registered to the database based on the historical statistic data of historical search conducted on the database comprises: selecting a search algorithm with the lowest time overhead as the current search algorithm.

Note time efficiency of search is one of important factors measuring the database system performance. Therefore, in this embodiment the impact of time overhead on the search performance is placed at the first consideration. Unlike the traditional relational database, when searching in the time series database, what is returned is one or more patterns (e.g., with a length of m) matching the target subsequence rather than one single value. When making similarity search in the time series database, the length of the target subsequence is one of important factors affecting response time of the time series database. Generally, the longer the target subsequence, the more the time overhead.

Therefore, when measuring response time of the time series database, if only durations for returning patterns by using a different search algorithm are compared but the length of the target subsequence is not considered, then the duration cannot effectively measure efficiency of the search algorithm. Therefore, time overhead for returning a time point in subsequences in the search result further needs to be calculated. Specifically, in the foregoing example, when searching in the database for a patient in whose ECG a given dangerous waveform appears, response time of the database is 1 second and the length of the dangerous waveform is 20 (i.e., comprising 20 time points), at this point the time overhead=1 second/20=0.05 second.

Note the lower time overhead, the higher time efficiency of searching in a corresponding data table by using a corresponding search algorithm. Therefore, a search algorithm with the lowest time overhead may be selected as the current search algorithm.

In one embodiment, the efficiency comprises a pruning ratio, the pruning ratio describing the ratio of the number of subsequences in the search result to the number of candidate subsequences returned from the database based on the current search algorithm; and selecting the search algorithm matching the condition from the plurality of search algorithms registered to the database based on the historical statistic data of the historical search conducted on the database comprises: selecting a search algorithm with the highest pruning ratio as the current search algorithm.

Note a variety of search algorithms have been developed so far. Although these search algorithms can output more accurate candidate subsequences, the set of candidate subsequences outputted by these search algorithms is usually greater than subsequences satisfying the search condition and is a super set of the set of subsequences actually matching the target subsequence. Therefore, the set of candidate subsequences returned by the search algorithm cannot be directly used as the search result but is subject to further verification.

In this embodiment, the ratio of the number of subsequences (i.e., patterns that actually satisfy the search condition) in the search result to the number of candidate subsequences returned from the database based on the current search algorithm may be referred to as pruning ratio. Since the set of candidate subsequences returned by the search algorithm is subject to further verification for ensuring only patterns that satisfy the query condition are returned, additional time overhead is needed. Therefore, the value of the pruning ratio will indirectly affect the response time of the database.

The higher the pruning ratio, the less the time needed by additional verification, and vice versa. Therefore, a search algorithm with the highest pruning algorithm may be selected as the current search algorithm.

Figure 6A:
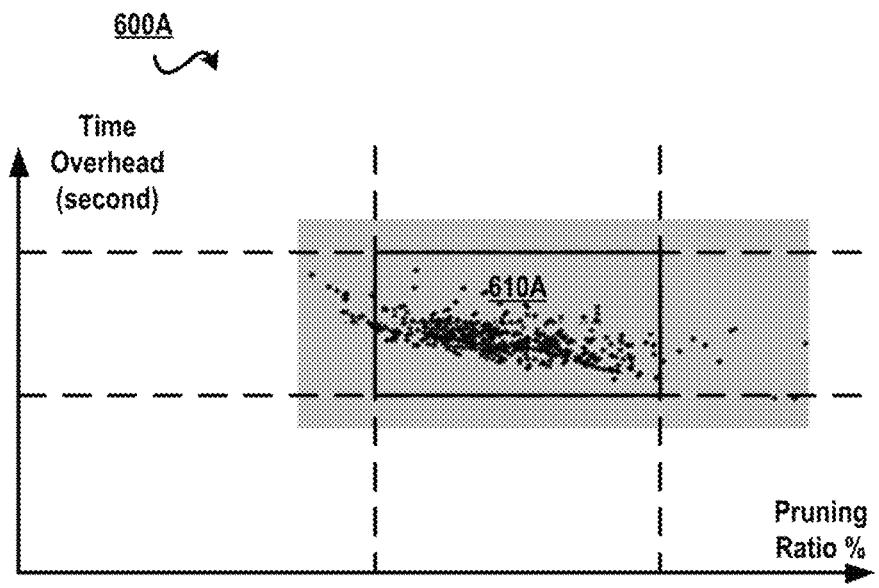
FIG. 6A schematically shows a block diagram of the process of forming historical statistic data according to one embodiment of the present invention, FIG. 6B schematically shows a block diagram of formed historical statistic data according to one embodiment of the present invention.
Figure 6B:
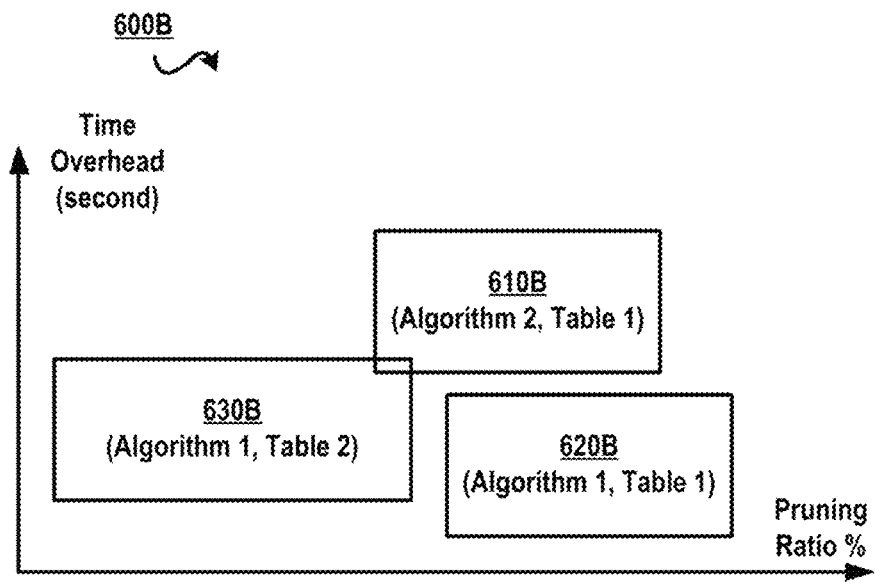

With reference to FIGS. 6A and 6B, detailed description is presented below to how to select a suitable search algorithm. FIG. 6A schematically shows a block diagram 600A of the process of forming historical statistic data according to one embodiment. As shown in FIG. 6A, statistic data of efficiency of historical search conducted on data tables in the database in a two-dimensional space. FIG. 6A shows statistic data of multiple historical searches conducted on a data table (e.g., data table 1) in the time series database by using a search algorithm (e.g., algorithm 2). As shown in this figure, the horizontal axis represents pruning ratios while the vertical axis represents time overhead, and each black dot in the grey background represents statistic data associated with one historical query.

In this embodiment, an area covering most black dots (e.g., 80%) may be used as historical statistic data associated with search algorithm 2 and data table 1. As seen from specific steps with reference to FIG. 6A, an area shown by a block 610A is historical statistic data associated with a two-tuple (algorithm 2, table 1). Using the above method, those skilled in the art can obtain corresponding historical statistic data from two-tuples formed by different search algorithms and different data tables.

FIG. 6B schematically shows a block diagram 600B of formed historical statistic data according to one embodiment. Specifically, a block 610B shows historical statistic data associated with a two-tuple (algorithm 2, table 1), a block 620B shows historical statistic data associated with a two-tuple (algorithm 1, table 1), and a block 630B shows historical statistic data associated with a two-tuple (algorithm 1, table 2). Where there is historical statistic data as shown in FIG. 6B, a suitable search algorithm may be selected based on FIG. 6B.

As shown above, the time overhead and the pruning ratio are two parameters for measuring suitability of a search algorithm. Therefore, where there are a plurality of search algorithms used for searching in one data table, a search algorithm (i.e., a search algorithm with the least time overhead and the highest pruning ratio) closer to the lower right of the figure may be selected from blocks shown in FIG. 6B. Specifically, when there is a need to search in table 1, it can be learned by comparing blocks 610B and 620B that algorithm 1 is most efficiency, so algorithm 1 can be selected for searching in table 1 in the time series database.

In one embodiment, there is further comprised: updating the historical statistic data based on statistic information that is collected during obtaining the search result from the database by using the search algorithm.

Note related historical statistic data may be updated with each query conducted with respect to the database. For example, when conducting a current query, related historical statistic data may be updated (i.e., one black dot is added to the figure shown in FIG. 6A) using time overhead and pruning ratio obtained during the current query, by means of the method as shown in FIG. 6A. With the continuous increase of black dots, the position of block 610A may change continuously so as to provide more historical samples for subsequent search.

By means of the method described above, the most suitable search algorithm may be selected based on a condition for search in the database (i.e., the time series database). Note the historical statistic data for search in the database is taken into consideration when selecting a search algorithm, so a search algorithm best matching the condition may be selected from a plurality of algorithms registered to the database, thereby greatly increasing search efficiency.

Further note in real application environment, usually user demands cannot be satisfied if only the time series database is used, but data is stored by the time series database jointly with the traditional relational database. Specifically, in a hospital's database system, a conventional relational database stores patients' basic information (e.g., ID, name, gender, birthday, etc.) and medical records, and further a time series database stores inspection data such as ECG.

In real application environment, usually there is a need to search in these two types of databases. For example, a doctor might want to find from the database system data of a male patient (search condition 2) in whose ECG a given dangerous waveform (search condition 1) appears. At this point the dangerous waveform is a target subsequence in similarity search. Under the current technical solution, the user has to search manually. It may be understood that the existing technical solution is both time consuming and laborious. Therefore, how to provide a more efficient search method in multiple types of databases becomes a burning problem.

Those skilled in the art should understand since search conditions in real application environment are diverse, there is usually a need to search across different types of databases. Specifically, in application environment of a hospital, inspection data like ECG may be stored using a data table (e.g., Table 1 below) in a time series database, and medical records and basic information (e.g., ID, name, gender, birthday, etc.) of the patients may be stored using a data table (e.g., Table 2 below) in a conventional relational database.

TABLE 1

ECG Data (Data Table: ECG_Data)

| ID | Name | ECG |
|---|---|---|
| 110 . . . 0001 | Bob | 10, 20, 30, . . . |
| 110 . . . 0010 | Alice | 15, 21, 31, . . . |
| 210 . . . 0000 | Charlie | 10, 20, 35, . . . |
| . . . | . . . | . . . |

TABLE 2

Patients' Basic Information (Data Table: Patient)

| ID | Name | Gender | Birthday | . . . |
|---|---|---|---|---|
| 110 . . . 0001 | Bob | male | 1980 Jan. 1 | . . . |
| 110 . . . 0010 | Alice | female | 1970 Jan. 1 | . . . |
| 210 . . . 0000 | Charlie | male | 1960 Oct. 31 | . . . |
| . . . | . . . | . . . | . . . | . . . |

When it is desired to find data of a male patient (search condition 2) in whose ECG a given dangerous waveform (search condition 1) appears, since the existing database system does not support search for a result satisfying search conditions across a relational database and a time series database, the user has to manually find from the two different types of databases a search result 1 satisfying search condition 1 and a search result satisfying search condition 2, and manually look for an intersection of search result 1 and search result 2.

Figure 7:
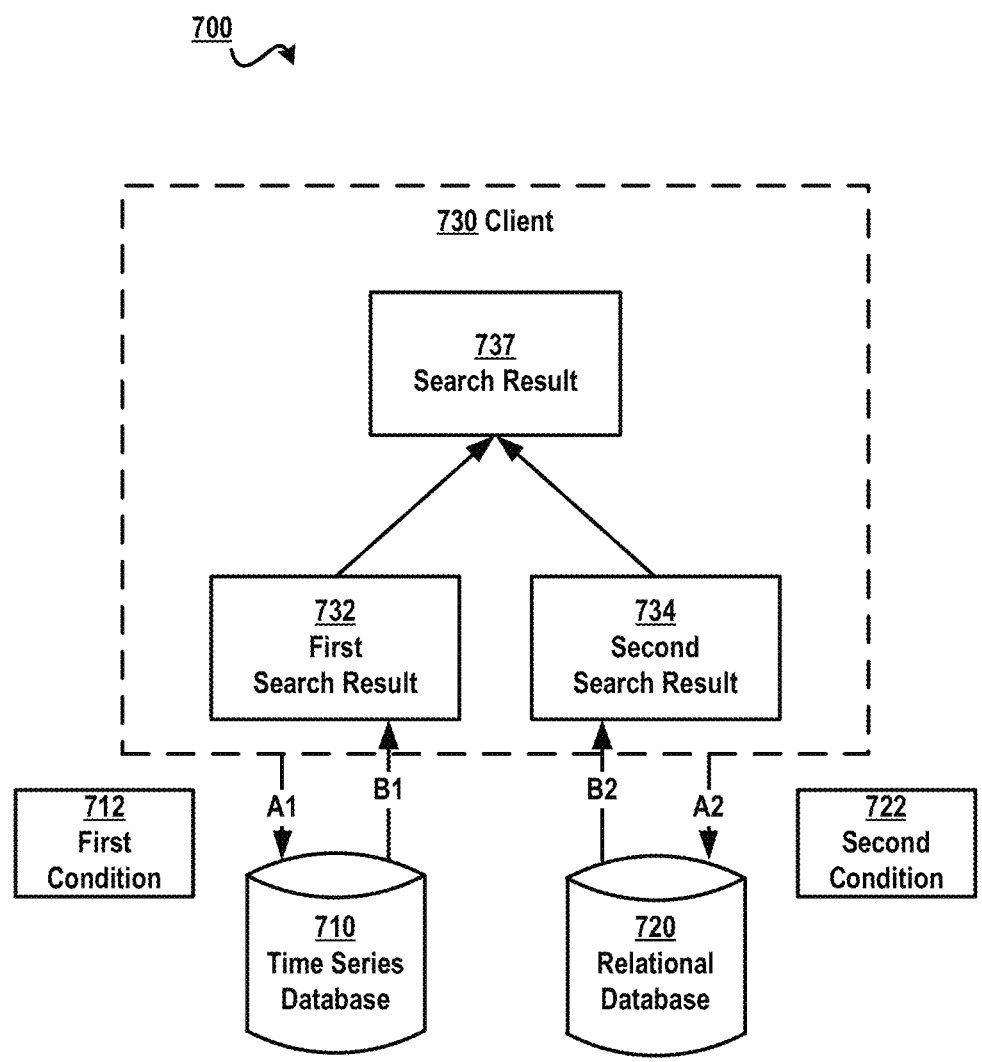
FIG. 7 schematically shows an architecture diagram of the process of searching across different types of databases according to one technical solution.

FIG. 7 schematically shows a block diagram 700 of the process of searching across different types of databases according to one technical solution. As shown in this figure, a time series database 700 includes the data table "ECG_Data" as shown in Table 1 for storing patients' ECGs; a relational database 720 includes the data table "Patient" as shown in Table 2 for storing patients' basic information. Note the data table "ECG_Data" is a data table in the time series database, and the data table "Patient" is a data table in the relational database.

As shown in FIG. 7, the user at a client 730 needs to search in time series database 710 using a first condition 712 (a given dangerous waveform appears in an ECG) (as shown by an arrow A1), and a first search result satisfying first condition 712 is retrieved from time series database 710 (as shown by an arrow B1). Suppose a dangerous waveform appears in ECGs of Bob and Alice, then at this point first search result 732 comprises data of Bob and Alice these two patients. In addition, the user at client 730 needs to search in relational database 720 by using a second condition 722 (male) (as shown by an arrow A2) and retrieve a second search result satisfying second condition 722 from relational database 720 (as shown by an arrow B2). At this point, second search result 734 comprises data of Bob and Charlie these two patients.

Next, the user at client 730 further needs to find search result 737 satisfying both search conditions based on first search result 732 and second search result 734. In other words, by calculating an intersection of {Bob, Charlie} and {Bob, Alice}, it can be learned that the patient satisfying both search conditions is Bob.

As seen from the technical solution shown in FIG. 7, since the existing database system does not support search across multiple types of databases, the user at client 730 has to conduct huge manual operations. At this point, the user's work is rather boring but heavy.

Therefore, it is desired to provide a technical solution that a database system automatically conducts search across multiple types of databases. Further, it is desired that a user can obtain a search result satisfying search conditions from the database system simply by submitting a search request to the database system according to a format (e.g., a format similar to SQL) supported by the database system.

In view of the above various drawbacks in the existing technical solution, one embodiment proposes a method for searching in a database system, the database system comprising a first database that is a time series database and a second database that is a relational database, the method comprising: in response to receiving a search request, extracting from the search request a first search request to search in the first database and a second search request to search in the second database; searching in the first database using the first search request, and searching in the second database using the second search request, by means of a method disclosed herein; and generating a search result to respond to the search request based on a first search result from the first database and a second search result from the second database.

Figure 8:
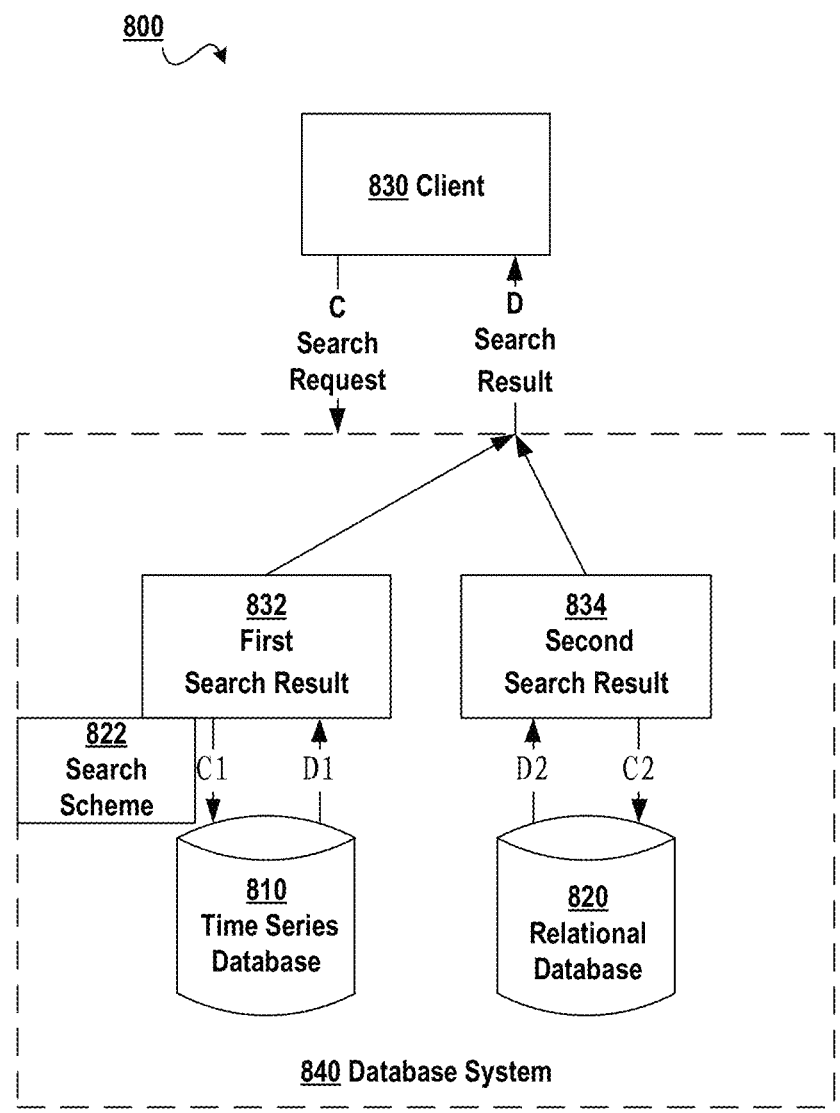
FIG. 8 schematically shows an architecture diagram of a technical solution for searching in a database system comprising different types of databases according to one embodiment of the present invention.
Figure 9:
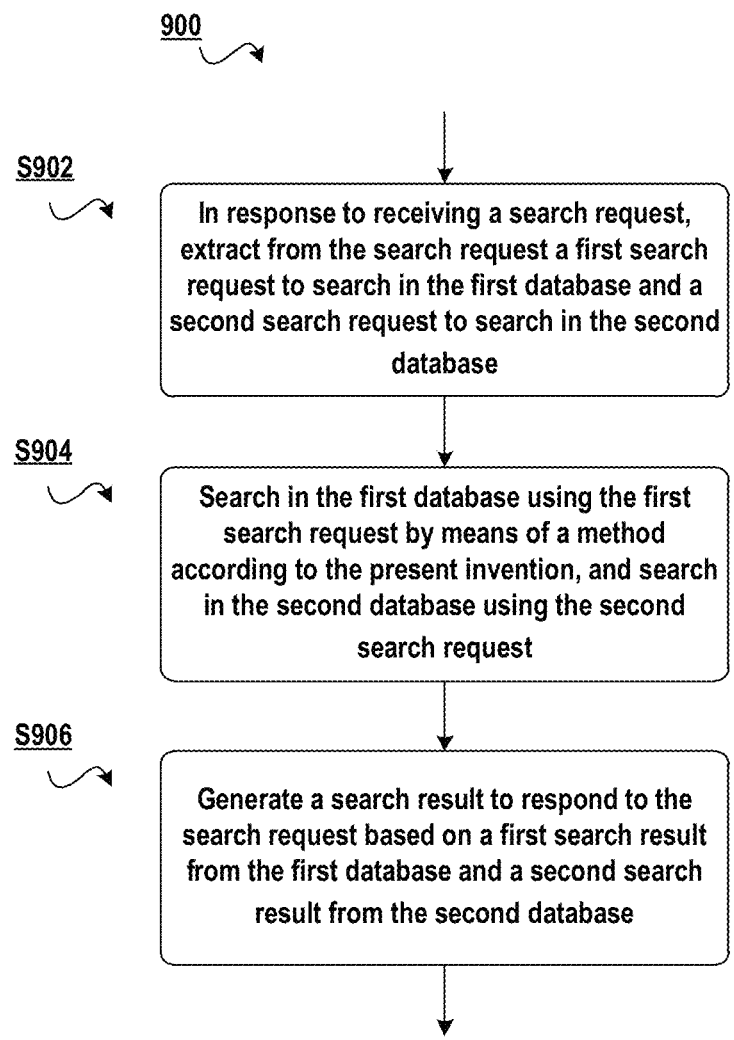
FIG. 9 schematically shows a flowchart of a method for searching in a database system according to one embodiment of the present invention.

FIG. 8 schematically shows an architecture diagram 800 of a technical solution for searching in a database system according to one embodiment. Thus, a technical solution may be provided for searching across multiple types of databases so as to support a user to obtain a desired search result from the database system without a need to know interaction details of the multiple types of databases.

Specifically, as shown in FIG. 8, a database system 840 comprises multiple types of databases, i.e., a time series database 810 and a relational database 820. According to one embodiment, the user at a client 830 does not have to conduct manual search in different types of databases, but can obtain a desired search result from database system 840 (as shown by an arrow D) simply by submitting to database system 840 a search result satisfying specific format requirements (as shown by an arrow C).

In this embodiment, search is conducted in time series database 810 and relational database 820 respectively within database system 840 (as shown by arrows C1 and C2), at which point search conditions used for the two databases are conditions extracted from a search request from client 830. Subsequently, after a first search result 832 and a second search result 834 are obtained from time series database 810 and relational database 820 respectively, the two search results may be assembled within database system 840 so as to generate a search result satisfying the search result from client 830. Next, the search result is returned to client 830 from database system 840 (as shown by an arrow D).

Note the second database is a relational database, so search may be conducted in the relational database using various existing search methods. The first database is a time series database. In order to increase the search efficiency in the time series database, the above method, i.e., the technical solution for selecting a search algorithm (as denoted by a reference numeral 822 in FIG. 8) based on a search condition for the first database and searching may be adopted.

By means of the technical solution as shown in FIG. 8, database system 840 provides to client 830 uniform management of time series database 810 and relational database 820 within database system 840. In this manner, manual operations of the user at client 830 can be reduced significantly.

In one embodiment, there is proposed a method for searching in a database system, the database system comprising a first database that is a time series database and a second database that is a relational database, the method comprising: in step S902, in response to receiving a search request, a first search request to search in the first database and a second search request to search in the second database are extracted from the search request.

Those skilled in the art may customize a data format of the search request, for example, may use a format similar to an SQL statement in the prior art. One format definition which those skilled in the art may adopt is illustrated below.

Select id from VT_SearchResult, Patient where patternlike ('10,20 . . . ', 0.1) and tstable='ECG Data' and attribute="ECG" and VT_SearchResult.id=Patient.id and Patient.gender='male'

The purpose of this search request is to search in ECG data for a male patient's ID of a pattern that is similar to a target subsequence "10,20 . . . " (e.g., the error bound equals 0.1). Those skilled in the art should understand the above search statement is merely one specific example. Those skilled in the art may design other format definition based on requirements of specific application environment, so long as the format definition can clearly define search conditions for the second database and the first database.

Note the foregoing format definition only illustrates one simple example of search conditions, and those skilled in the art may modify search conditions based on requirements of specific application environment. For example, it may be specified that data of male patients aging above 60 is searched for in the second database, and it may be specified that data of patients in whose ECGs a dangerous waveform appears and who are inspected between Dec. 19, 2013 and Jan. 1, 2013. At this point, a search request may be as below:

Select id from VT_SearchResult, Patient where patternlike ('10,20 . . . ', 0.1) and tstable='ECG Data' and attribute="ECG" and startts='2013 Dec. 19' and endts='2014 Jan. 1' and VT_SearchResult.id=Patient.id and Patient.gender='male' and Patient.age>60

In step S904, the first database is searched in using the first search request, and the second database is searched in using the second search request. Specifically, a first condition for searching in the first database and a second condition for searching in the second database may be extracted from the first search request and the second search request respectively, so as to search in the first database and the second database.

Specifically, the first condition is a condition for searching in the first database. In the foregoing example, the first condition is "a patient in whose ECG a dangerous waveform appears." Therefore, a corresponding patient may be found in the first database for storing patients' ECGs using the first condition: patternlike ('10,20 . . . ', 0.1) and tstable='ECG_Data' and attribute="ECG".

In this embodiment, patternlike ('10,20 . . . ', 0.1) may be a function for searching in the time series database for subsequences including a target subsequence '10,20 . . . .' In this function, those skilled in the art may customize an error bound between the target subsequence and a search result. For example, the error bound may be defined as 0.1, or the error bound may be defined as a higher or lower value based on requirements on search precision.

Note the search function patternlike( ) is merely one example of a function for similarity search in the time series database. Those skilled in the art may conduct search using various similarity search that is existing or to be developed later, or may further customize other similarity search function based on requirements of specific application environment. In the foregoing example, the first condition means looking for a pattern that is similar to a target subsequence in a time series recorded by a field "ECG" in the data table "ECG_Data" in the time series database by using the similarity search function patternlike( ).

In this embodiment, the second condition is a condition for searching in the second database. In the foregoing example, the second condition is "male patient." Therefore, a condition "Patient.gender='male'" may be used to find all male patients in the second database where patients' basic information is stored.

Detailed description has been presented to steps for searching in the time series database (i.e., first database) with reference to FIG. 5 above, which are thus not detailed here. In addition, those skilled in the art should understand since the second database is a traditional relational database, in this embodiment search can be conducted in the second database using various search algorithms that are currently known or to be developed later, which is not detailed below.

In step S906, a search result is generated to respond to the search request based on a first search result from the first database and a second search result from the second database. The first search result and the second result satisfy different search conditions in the search request, so a final search result can be obtained based on the first search result and the second search result (for example, an intersection of the first search result and the second search result may be calculated).

Continuing the above example, the first search result includes data of patients in whose ECGs a dangerous waveform appears, and the second search result includes data of male patients. Therefore, the intersection of the two search results is data of male patients in whose ECGs the dangerous waveform appears.

In one embodiment, the generating a search result to respond to the search request based on a first search result from the first database and a second search result from the second database comprises: joining the first search result and the second search result to generate the search result.

The joining operation here is a joining operation in the database. In this manner, an intersection of the first search result and the second search result can be obtained and used as a final search result. For example, in the foregoing search statement, "VT_SearchResult.id=Patient.id" joins the first search result VT_SearchResult (records of patients in whose ECG data a dangerous waveform appears in the data table ECG_Data in the time series database) and the second search result (records of male patients in the data table Patient in the relational database) so as to obtain the final search result (i.e., id of a male patient in whose ECG data the dangerous waveform appears).

In one embodiment, the search request is a request from a client, and the search result is generated by the database system. Query operations may be performed across different types of databases in the database system; the user does not have to perform complex manual operations as the prior art, but simply by providing to the database system a search request satisfying format definition, can obtain from the database system a search result satisfying the search request.

Various embodiments implementing a method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 10A:
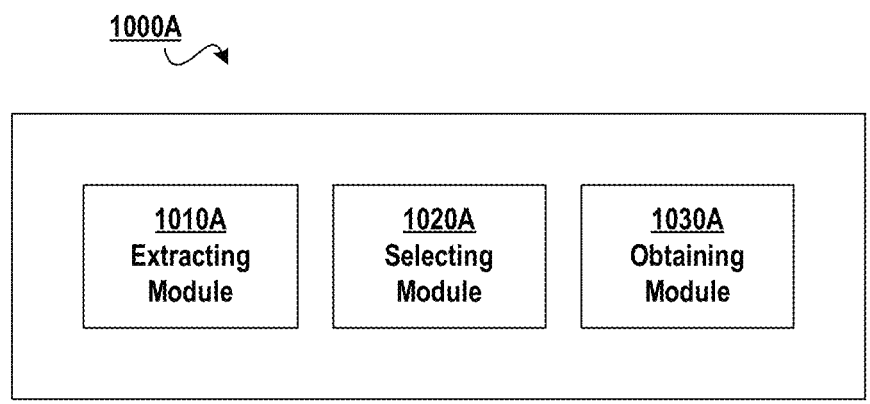
FIG. 10A schematically shows a block diagram of an apparatus for searching in a database according to one embodiment of the present invention, and FIG. 10B schematically shows a block diagram of an apparatus for searching in a database system according to one embodiment of the present invention.

FIG. 10A schematically shows a block diagram 1000A of an apparatus for searching in a database. Specifically, there is provided an apparatus for searching in a database, comprising: an extracting module 1010A configured to, in response to receiving a search request to search in a database, extract from the search request a condition for searching in the database; a selecting module 1020A configured to select a search algorithm matching the condition from a plurality of search algorithms registered to the database, based on historical statistic data of historical search conducted on the database; and an obtaining module 1030A configured to obtain a search result from the database by using the search algorithm, wherein the database is a time series database.

In one embodiment, the historical statistic data is associated with corresponding efficiency of searching in the database by using various search algorithms among the plurality of search algorithms.

In one embodiment, the historical statistic data is further associated with efficiency of searching in a table of the database by using the various search algorithms.

In one embodiment, the efficiency includes time overhead, the time overhead describing time overhead for returning one time point in subsequences in the search result; and the selecting module comprises: a first selecting module configured to select a search algorithm with the lowest time overhead as the current search algorithm.

In one embodiment, the efficiency comprises a pruning ratio, the pruning ratio describing the ratio of the number of subsequences in the search result to the number of candidate subsequences returned from the database based on the current search algorithm; and the selecting module comprises: a second selecting module configured to select a search algorithm with the highest pruning ratio as the current search algorithm.

In one embodiment, there is further comprised: an updating module configured to update the historical statistic data based on statistic information that is collected during obtaining the search result from the database by using the search algorithm.

Figure 10B:
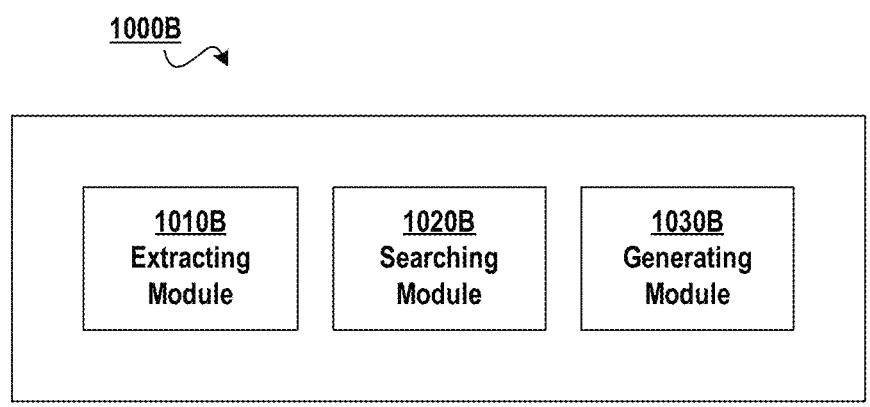

FIG. 10B schematically shows a block diagram 1000B of an apparatus for searching in a database system according to one embodiment. Specifically, there is provided an apparatus for searching in a database system, the database system comprising a first database that is a time series database and a second database that is a relational database, the apparatus comprising: an extracting module 1010B configured to, in response to receiving a search request, extract from the search request a first search request to search in the first database and a second search request to search in the second database; a searching module 1020B configured to search in the first database using the first search request, and search in the second database using the second search request, by means of an apparatus; and a generating module 1030B configured to generate a search result to respond to the search request based on a first search result from the first database and a second search result from the second database.

In one embodiment, generating module 1020B comprises: a joining module configured to join the first search result and the second search result to generate the search result.

In one embodiment, the search request is a request from a client, and the searching module is at the database system.

By means of the methods and apparatuses disclosed herein, when there is a need to search a database system comprising various types of databases, the user does not have to care about interaction details of various types of databases within the database system, but can obtain a search result from the database simply by providing a search request to the database system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:
  receiving a search request to perform a search in a time series database, where the time series database stores a plurality of sequences of measured values arranged in chronological order;
  extracting from the search request a condition for performing the search in the time series database, the condition including a target pattern to be searched for within the plurality of sequences of measured values within the time series database;
  selecting a search algorithm to perform the search from a plurality of search algorithms registered to the time series database, based on one or more characteristics of the condition and historical statistic data of one or more historical searches conducted on the time series database, where:
    the historical statistic data is associated with an efficiency of searchinq in the time series database by using each of the search algorithms within the plurality of search algorithms,
    the efficiency includes a time overhead describing an amount of time for returning one time point in a pattern in an historical search result, and
    selecting the search algorithm to perform the search includes selecting one of the plurality of search algorithms having a lowest time overhead as the search algorithm to perform the search; and
  obtaining a search result from the time series database, utilizing the search algorithm.

2. The computer-implemented method according to claim 1, further comprising: updating the historical statistic data based on statistic information collected during obtaining the search result from the time series database utilizing the search algorithm.

3. A computer-implemented method, comprising:
receiving a search request to perform a search in a first database that is a time series database and a second database that is a relational database, where the time series database stores a plurality of sequences of measured values arranged in chronological order;
extracting from the search request a first search request to search in the first database and a second search request to search in the second database, where the first search request includes a target pattern to be searched for within the plurality of sequences of measured values within the time series database;
searching in the first database using the first search request, and searching in the second database using the second search request; and
generating a search result to respond to the search request based on a first search result from the first database and a second search result from the second database.

4. The computer-implemented method according to claim 3, wherein generating the search result to respond to the search request based on the first search result from the first database and the second search result from the second database comprises:
joining the first search result and the second search result to generate the search result.

5. The computer-implemented method according to claim 3, wherein the search request is a request from a client, and the search result is generated by a database system.

6. An apparatus for searching in a database, where the apparatus:
receives a search request to perform a search in a time series database where the time series database stores a plurality of sequences of measured values arranged in chronological order;
extracts from the search request a condition for performing the search in the time series database, utilizing a processor, the condition including a target pattern to be searched for within the plurality of sequences of measured values within the time series database;
selects a search algorithm to perform the search from a plurality of search algorithms registered to the time series database, utilizing the processor, based on one or more characteristics of the condition and historical statistic data of one or more historical searches conducted on the time series database, where:
the historical statistic data is associated with an efficiency of searching in the time series database by using each of the search algorithms within the plurality of search alqorithms,
the efficiency includes a time overhead describing an amount of time for returninq one time point in a pattern in an historical search result, and
selectinq the search alqorithm to perform the search includes selectinq one of the plurality of search algorithms having a lowest time overhead as the search algorithm to perform the search; and
obtains, utilizing the processor, a search result from the time series database, utilizing the search algorithm.

7. The apparatus according to claim 6, where the apparatus further updates the historical statistic data based on statistic information collected during obtaining the search result from the time series database utilizing the search algorithm.

8. An apparatus for searching in a database system, where the apparatus:
receives a search request to perform a search in a first database that is a time series database and a second database that is a relational database, utilizing a processor, where the time series database stores a plurality of sequences of measured values arranged in chronological order;
extracts from the search request a first search request to search in the first database and a second search request to search in the second database, utilizing the processor, where the first search request includes a target pattern to be searched for within the plurality of sequences of measured values within the time series database;
searches in the first database using the first search request, and searches in the second database using the second search request, utilizing the processor; and
generates a search result to respond to the search request based on a first search result from the first database and a second search result from the second database, utilizing the processor.

9. The apparatus according to claim 8, wherein generating the search result includes joining the first search result and the second search result.

10. The apparatus according to claim 8, wherein the search request is a request from a client, and the apparatus generates the search result at the database system.

11. A computer program product for searching in a database, the computer program product comprising a computer readable storage medium having program instructions embodied therewith, wherein the computer readable storage medium is not a transitory signal per se, the program instructions executable by a processor to cause the processor to:
receive a search request to perform a search in a time series database, where the time series database stores a plurality of sequences of measured values arranged in chronological order;
extract, by the processor, from the search request a condition for performing the search in the time series database, the condition including a target pattern to be searched for within the plurality of sequences of measured values within the time series database;
select, by the processor, a search algorithm to perform the search from a plurality of search algorithms registered to the time series database, based on one or more characteristics of the condition and historical statistic data of one or more historical searches conducted on the database, where:
the historical statistic data is associated with an efficiency of searchinq in the time series database by using each of the search algorithms within the plurality of search algorithms,
the efficiency includes a time overhead describinq an amount of time for returninq one time point in a pattern in an historical search result, and
selecting the search algorithm to perform the search includes selecting, by the processor, one of the plurality of search algorithms having a lowest time overhead as the search algorithm to perform the search; and
obtain, by the processor, a search result from the time series database, utilizing the search algorithm.

12. The computer program product according to claim 11, further comprising: updating, by the processor, the historical statistic data based on statistic information collected during obtaining the search result from the time series database utilizing the search algorithm.

\* \* \* \* \*